US012695654B2

(12) United States Patent
Xu et al.

(10) Patent No.: US 12,695,654 B2
(45) Date of Patent: Jul. 28, 2026

(54) METHODS, DEVICES, AND SYSTEMS FOR TRANSMITTING INITIAL ACCESS SIGNALS OR CHANNELS

(71) Applicant: ZTE Corporation, Shenzhen (CN)

(72) Inventors: Hanqing Xu, Shenzhen (CN); Li Tian, Shenzhen (CN); Ling Yang, Shenzhen (CN); Ziyang Li, Shenzhen (CN); Yajun Zhao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 322 days.

(21) Appl. No.: 17/874,673

(22) Filed: Jul. 27, 2022

(65) Prior Publication Data

US 2022/0360481 A1    Nov. 10, 2022

Related U.S. Application Data

(63) Continuation of application No. PCT/CN2020/133237, filed on Dec. 2, 2020.

(51) Int. Cl.
*H04L 27/26*      (2006.01)
*H04W 56/00*      (2009.01)

(52) U.S. Cl.
CPC .... *H04L 27/26025* (2021.01); *H04L 27/2605* (2013.01); *H04W 56/001* (2013.01)

(58) Field of Classification Search
None
See application file for complete search history.

(56) References Cited

U.S. PATENT DOCUMENTS

| | | | |
|---|---|---|---|
| 9,549,410 B2 | 1/2017 | Sinnaduray | |
| 11,102,047 B2 * | 8/2021 | Yeo | H04L 1/0045 |
| 2018/0098298 A1 * | 4/2018 | Jung | H04W 74/004 |
| 2019/0037509 A1 * | 1/2019 | Li | H04W 56/001 |

(Continued)

FOREIGN PATENT DOCUMENTS

| | | |
|---|---|---|
| CN | 110035510 A | 7/2019 |
| CN | 110603852 A | 12/2019 |

(Continued)

OTHER PUBLICATIONS

Extended European Search Report and Written Opinion regarding EP 20 96 3 874 dated Dec. 12, 2022.

(Continued)

*Primary Examiner* — Christopher T Wyllie
(74) *Attorney, Agent, or Firm* — Crowell & Moring LLP

(57)      ABSTRACT

The present disclosure describes methods, systems and devices for transmitting initial access information from a base station to a user equipment (UE). One method includes notifying, by the base station, the UE to support at least one subcarrier spacing (SCS); communicating, by the base station, a subcarrier offset to the UE; and configuring, by the base station, a multiplexing pattern between initial access information. Another method includes receiving, by the UE from the base station, notification to support at least one subcarrier spacing (SCS); receiving, by the UE from the base station, a communication comprising a subcarrier offset; and receiving, by the UE from the base station, a configuration for a multiplexing pattern between initial access information.

10 Claims, 8 Drawing Sheets

400 notifying, by the base station, the UE to support at least one subcarrier spacing (SCS)    410 communicating, by the base station, a subcarrier offset to the UE    420 configuring, by the base station, a multiplexing pattern between initial access information.    430

(56) References Cited

U.S. PATENT DOCUMENTS

| | | | | |
|---|---|---|---|---|
| 2019/0306832 | A1* | 10/2019 | Si | H04W 76/15 |
| 2020/0153569 | A1* | 5/2020 | Xu | G01S 7/022 |
| 2020/0169341 | A1* | 5/2020 | Hwang | H04B 17/327 |
| 2021/0006997 | A1* | 1/2021 | Jin | H04B 17/382 |
| 2021/0345340 | A1* | 11/2021 | Ma | H04L 5/0053 |
| 2022/0070824 | A1* | 3/2022 | Chen | H04L 5/0053 |
| 2022/0360481 | A1* | 11/2022 | Xu | H04L 5/0053 |
| 2023/0071890 | A1* | 3/2023 | Jiang | H04L 5/0053 |
| 2023/0164714 | A1* | 5/2023 | Kim | H04W 56/0015 |
| 2023/0189225 | A1* | 6/2023 | Hou | H04L 5/0053 |
| | | | | 370/329 |
| 2023/0353332 | A1* | 11/2023 | Wu | H04L 5/0048 |
| 2024/0040392 | A1* | 2/2024 | Qiao | H04L 5/0007 |
| 2024/0284362 | A1* | 8/2024 | Abedini | H04W 56/001 |

FOREIGN PATENT DOCUMENTS

| | | | | |
|---|---|---|---|---|
| CN | 111066276 | A | | 4/2020 |
| CN | 111669235 | B | * 4/2022 | H04B 17/382 |
| CN | 115208532 | A | * 10/2022 | H04L 27/0006 |

OTHER PUBLICATIONS

Intellectual Property Office of India First Examination Report regarding Application No. 202217043037 dated May 8, 2024, 6 pages.

Moderator (Intel Corporation), R1-2009779, "Summary #2 of 38.808 TR Text Proposal Discussion," 3GPP TSG RAN WG1 Meeting, Oct. 26-Nov. 13, 2020.

Moderator (Intel Corporation), R1-2009718 [103-e-NR-52-71-Waveform-Changes] Discussions Summary #6, Oct. 26-Nov. 13, 2020.

Intel Corporation, R1-2009379, Discussion on Required Changes to NR in 52.6-71 GHz, 3GPP TSG RAN WG1 Meeting #103-e, Oct. 26-Nov. 13, 2020.

Moderator (Intel Corporation), R1-2009313, "Issue Summary for physical layer changes for supporting NR from 52.6 GHz to 71 GHz," 3GPP TSG RAN WG1 Meeting Oct. 26-Nov. 13, 2020.

Samsung, R1-2008872, "Design aspects for extending NR to up to 71 GHz," 3GPP TSG RAN WG1 #103-e, e-Meeting, Oct. 26-Nov. 13, 2020.

Wilus Inc., R1-2008726, "Discussion on physical layer aspects for NR beyond 52.6GHz," 3GPP TSG RAN WG1 #103-e, e-Meeting, Oct. 26-Nov. 13, 2020.

MediaTek Inc., R1-2008501, "On required changes to NR using existing DL UL NR waveform for operation in 60GHz band," 3GPP TSG RAN WG1 #103-e, e-Meeting, Oct. 26-Nov. 13, 2020.

Apple Inc., R1-2008457, "A Discussion on Physical Layer Design for NR between 52.6GHz and 71 GHz," 3GPP TSG RAN WG1 #103-e, e-Meeting, Oct. 26-Nov. 13, 2020.

Ericsson, R1-2007982, "On NR operations in 52.6 to 71 GHz," 3GPP TSG-RAN WG1 Meeting #103-e, e-Meeting, Oct. 26-Nov. 13, 2020.

CATT, R1-2007847, "System Analysis of NR operation in 52.6 to 71 GHz," e-Meeting, Oct. 26-Nov. 13, 2020.

Vivo, R1-2007652, "Discussions on required changes to NR using existing NR waveform," 3GPP TSG RAN WG1 #103-e, e-Meeting, Oct. 26-Nov. 13, 2020.

Huawei, HiSilicon, R1-2007604, "PHY design in 52.6-71 GHz using NR waveform," 3GPP TSG RAN WG1 Meeting #103-e, e-Meeting, Oct. 26-Nov. 13, 2020.

Ericsson, R1-2007046, "On NR operations in 52.6 to 71 GHz," 3GPP TSG-RAN WG1 Meeting #102-e, e-Meeting, Oct. 26-Nov. 13, 2020.

Intel Corporation, R1-2006986, "Discussion on Required Changes to NR in 52.6-71 GHz," 3GPP TSG RAN WG1 Meeting #102-e, e-Meeting, Oct. 26-Nov. 13, 2020.

Moderator (Intel Corporation), R1-2006982, "Issue Summary for physical layer changes for supporting NR from 52.6 GHz to 71 GHz," 3GPP TSG RAN WG1 Meeting Oct. 26-Nov. 13, 2020.

Ericsson, R1-2005920, "On NR operations in 52.6 to 71 GHz," 3GPP TSG-RAN WG1 Meeting #102-e, Oct. 26-Nov. 13, 2020.

CATT, R1-2005700, "Channel Access Mechanism in support," 3GPP TSG RAN WG1 #102-e, e-Meeting Aug. 17-28, 2020.

Huawei, HiSilicon, R1-2005241, "PHY design in 52.6-71 GHz using NR waveform," 3GPP TSG RAN WG1 Meeting #102-e, E-meeting, Aug. 17-28, 2020.

International Search Report and Written Opinion regarding PCT/CN2020/133237 dated Aug. 30, 2021.

Hua Wei et al. "Initial access signal and channels in NR unlicensed band" *3GPP TSG RAN WGJ Meeting #99 RI-1911863*, 22 Nov. 22, 2019.

Hua Wei et al. "Initial access signal and channels in NR unlicensed band" *3GPP TSG RAN WGJ Meeting #98bis RI-1910042*, 20 Oct. 20, 2019.

Japanese Notice of Final Official Action with English translation regarding 2022-546006 dated Nov. 21, 2023, 7 pages.

Intel Corporation, "Discussion on Updated to WID for extending current NR operation to 71 GHz [online]," 3GPP TSG RAN #90e RP-202350, Retrieved from the Internet: https://www.3gpp.org/ftp/tsg_ran/TSG_RAN/TSGR_90e/Docs/RP-202350.zip>, Nov. 30, 2020, 6 pages.

ZTE, Sanechips, "On WI scope of NR extended to 71GHz [online]," 3GPP TSG RAN #90e RP-202668, Retrieved from the Internet: https://www.3gpp.org/ftp/tsg_ran/TSG_RAN/TSGR_90e/Docs/RP-202668.zip>, Nov. 30, 2020, 8 pages.

Japanese Office Action and English Translation of the Official Action regarding 2022-546006 dated Jul. 26, 2023, 6 pages.

Huawei, "Initial access signal and channels in NR unlicensed band," 3GPP TSG RAN WG1 Meeting #99, R1-1911863, Reno, Nevada, Nov. 18-22, 2019.

Japanese Office Action with English translation of the Office Action regarding Application No. 2022-546006 dated Sep. 26, 2024, 13 pages.

3GPP TS 38.213 V16.3.0(Sep. 2020),3GPP, Release 16, 6 pages, Oct. 2020.

Japanese Appeal Decision with machine translation regarding Application No. 2022-546006 dated Mar. 11, 2025 (4 pages).

* cited by examiner

Processor(s) 221

Memories 222

Operating system 224

Instructions 226

Parameters 228

System Circuitry 204

I/O Interface 206

Tx / Rx Circuitry 208

2G/3G/4G/LTE/5G

Network interface circuitry 209

200

400 notifying, by the base station, the UE to support at least one subcarrier spacing (SCS)

410 communicating, by the base station, a subcarrier offset to the UE

420 configuring, by the base station, a multiplexing pattern between initial access information.

METHODS, DEVICES, AND SYSTEMS FOR TRANSMITTING INITIAL ACCESS SIGNALS OR CHANNELS

CROSS-REFERENCE TO RELATED APPLICATION

This application is a continuation application of PCT International Patent Application No. PCT/CN2020/133237, filed with the China National Intellectual Property Administration, PRC on Dec. 2, 2020, which is herein incorporated by reference in its entirety.

TECHNICAL FIELD

The present disclosure is directed generally to wireless communications. Particularly, the present disclosure relates to methods, devices, and systems for transmitting initial access signals or channels.

BACKGROUND

Wireless communication technologies are moving the world toward an increasingly connected and networked society. High-speed and low-latency wireless communications rely on efficient network resource management and allocation between user equipment and wireless access network nodes (including but not limited to base stations). A new generation network is expected to provide high speed, low latency and ultra-reliable communication capabilities and fulfil the requirements from different industries and users.

For the 5th Generation mobile communication technology, subcarrier spacing (SCS) for initial access and/or multiplexing patterns of one or more initial access signaling may vary for different frequency ranges, for example, a first frequency range (FR1) of below 7.125 GHz, and a second frequency range (FR2) of from 24.25 GHz to 52.6 GHz. There are one or more issue/problem associated with the existing system, for example but not limited to, how to notify one or more supported SCS to a user equipment, how to indicate a subcarrier offset to a user equipment, and/or how to configure a multiplexing pattern between initial access information.

The present disclosure may address at least some of issues/problems associated with the existing system to improve the performance of the wireless communication.

SUMMARY

This document relates to methods, systems, and devices for wireless communication, and more specifically, for transmitting initial access signals or channels.

In one embodiment, the present disclosure describes a method for wireless communication. The method includes transmitting, by a base station, initial access information to a user equipment (UE) by: notifying, by the base station, the UE to support at least one subcarrier spacing (SCS); communicating, by the base station, a subcarrier offset to the UE; and configuring, by the base station, a multiplexing pattern between initial access information.

In another embodiment, the present disclosure describes a method for wireless communication. The method includes receiving, by a user equipment (UE), initial access information from a base station by: receiving, by the UE from the base station, notification to support at least one subcarrier spacing (SCS); receiving, by the UE from the base station, a communication comprising a subcarrier offset; and receiving, by the UE from the base station, a configuration for a multiplexing pattern between initial access information.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4 shows a flow diagram of a method for wireless communication.

DETAILED DESCRIPTION

Figure 1A:
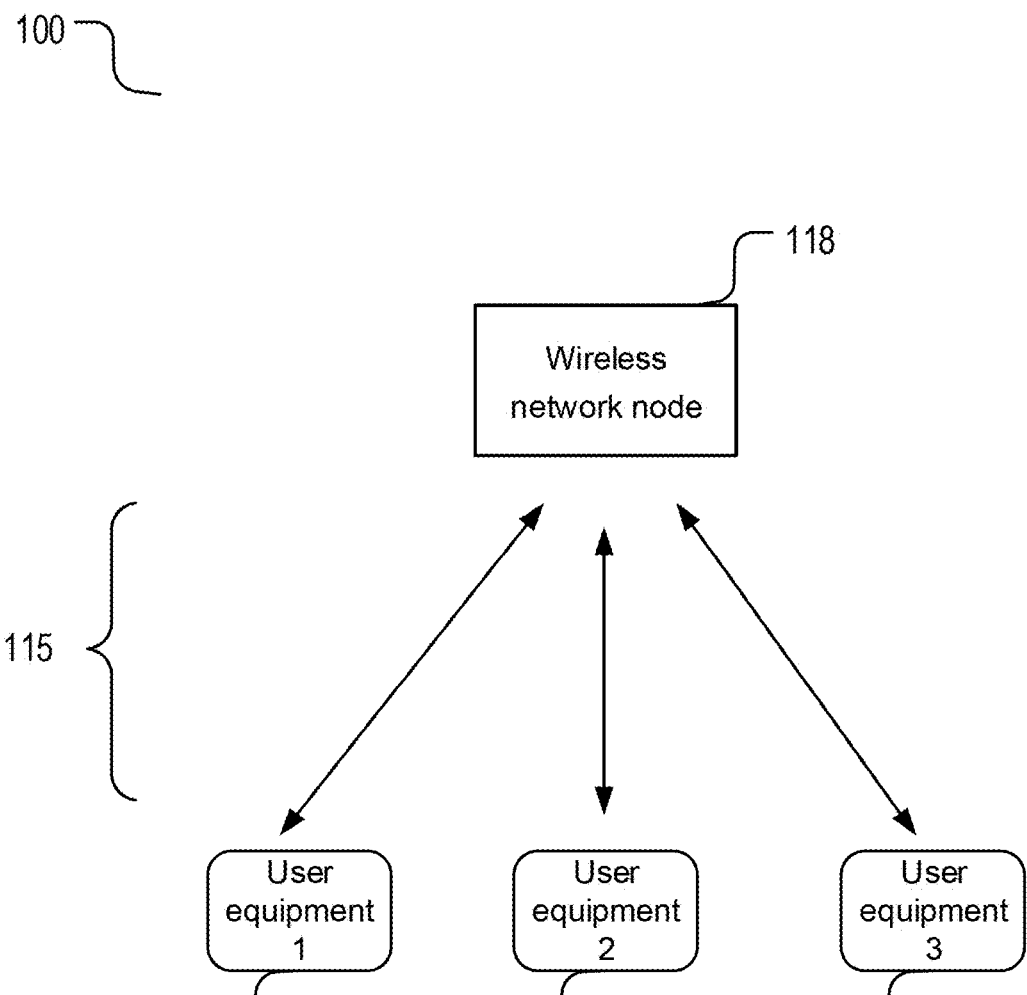
FIG. 1A shows an example of a wireless communication system include one wireless network node and one or more user equipment.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for transmitting initial access information to a user equipment.

New generation (NG) mobile communication system are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users.

The present disclosure describes various embodiments for transmitting initial access information to a user equipment. FIG. 1A shows a wireless communication system 100 including a wireless network node 118 and one or more user equipment (UE) 110. The wireless network node may include a network base station, which may be a nodeB (NB, e.g., a gNB) in a mobile telecommunications context. Each of the UE may wirelessly communicate with the wireless network node via one or more radio channels 115. For example, a first UE 110 may wirelessly communicate with a wireless network node 118 via a channel including a plurality of radio channels during a certain period of time. The network base station 118 may send initial access information to the UE 110.

Figure 1B:
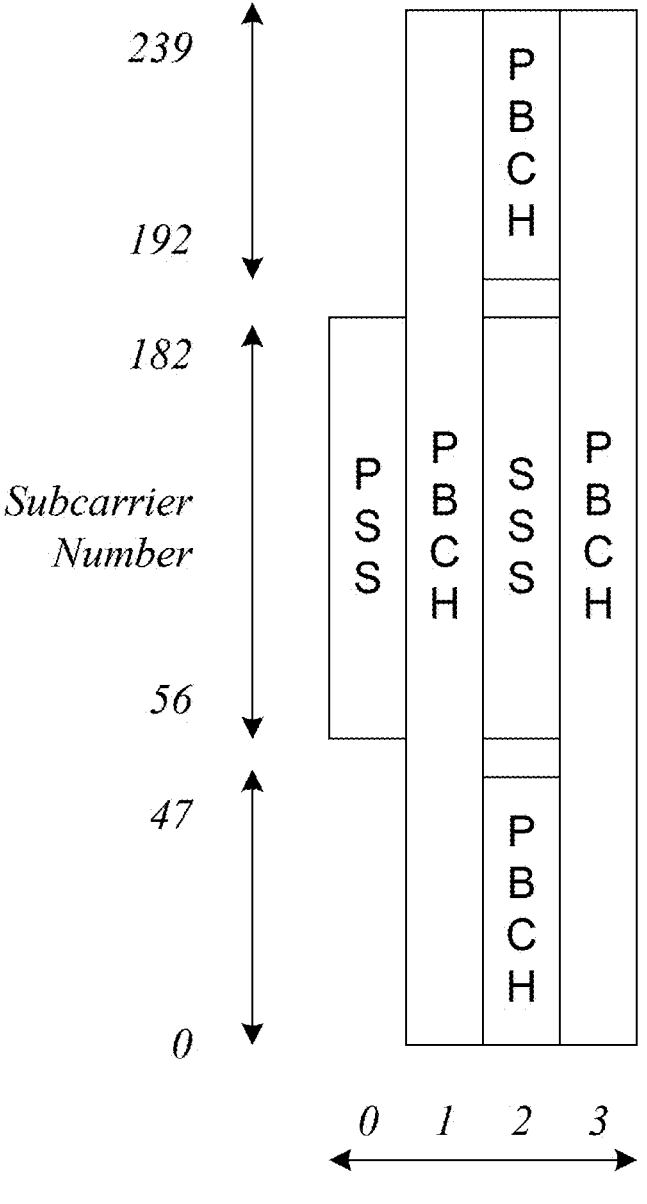
FIG. 1B shows a schematic diagram of a time-frequency structure of a synchronization signal (SS)/physical broadcast channel (PBCH) block (SSB).

For initial access, one or more synchronization signal (SS)/physical broadcast channel (PBCH) block (SSB) may be used for cell search. FIG. 1B describes synchronization and measurement including one or more primary synchronization signal (PSS), one or more secondary synchronization signal (SSS), and one or more PBCH.

PSS and SSS sequences may occupy one symbol each while PBCH may occupy three symbols of the 4-symbol SSB where in the symbol SSS is allocated PBCH resource elements (REs) are allocated around the SSS. NR may define two subcarrier spacings (SCSs) of 120 kHz ($\mu=3$) and 240 kHz ($\mu=4$) for the SSB transmission in a frequency range 2 (FR2) of from 24.25 GHz to 52.6 GHz.

Figure 1C:
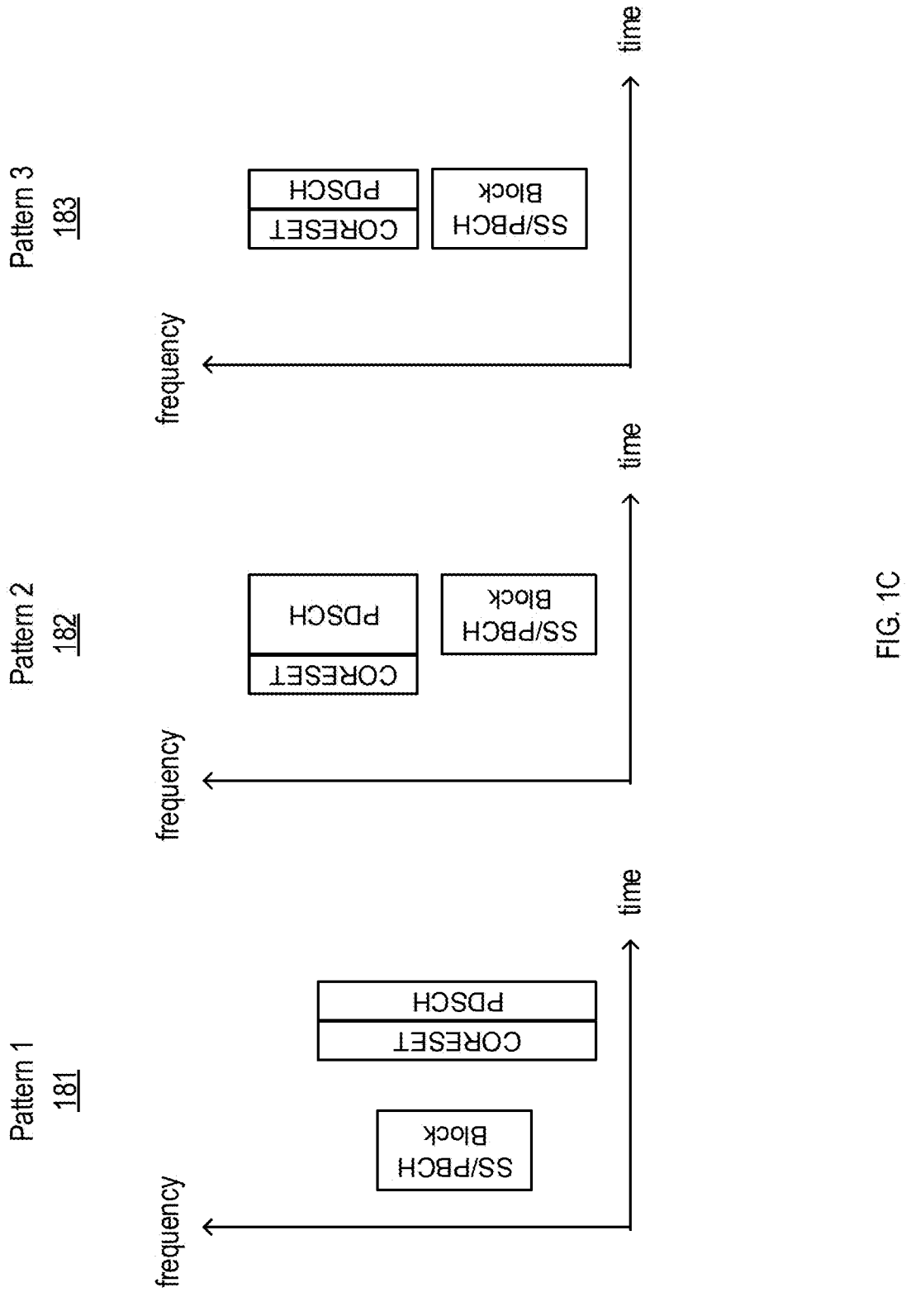
FIG. 1C shows one or more multiplexing pattern.

One or more control resource set (CORESET) for type-0 physical downlink control channel (Type0-PDCCH) common search space (CSS) set may be used for scheduling remaining minimum system information (RMSI) and other system information. SSB and CORESET for Type0-PDCCH multiplexing patterns in FR2 may include three different patterns (Pattern 1, Pattern 2, and Pattern 3) as shown in FIG. 1C. For the multiplexing patterns, time division multiplexing (TDM) and frequency division multiplexing (FDM) may be supported.

Referring to FIG. 1C, TDM multiplexing Type0-PDCCH in Pattern 1 (181) may be configured with a time offset of 0, 2.5, 5 or 7.5 ms relative to system frame number (SFN) boundary. Pattern 2 (182) and Pattern 3 (183) for Type0-PDCCH monitoring occasion may be in the same or previous slot where associated SSB is located. In some embodiments of the present disclosure, CORESET for Type0-PDCCH multiplexing patterns may be referred as CORESET0.

New radio (NR) may include two SCSs of 60 kHz ($\mu=2$) and 120 kHz ($\mu=3$) for the CORESET for Type0-PDCCH in FR2. FR2 for (SSS, Type0-PDCCH) may support at least one of the following subcarrier spacing combinations and corresponding applicable patterns: SCS for (SSB, Type0-PDCCH) being (120, 60) kHz and applicable Patterns 1 and 2; SCS for (SSB, Type0-PDCCH) being (120, 120) kHz and applicable Patterns 1 and 3; SCS for (SSB, Type0-PDCCH) being (240, 60) kHz and applicable Pattern 1; and SCS for (SSB, Type0-PDCCH) being (240, 120) kHz and applicable Patterns 1 and 2.

For Frequency Range 1 (FR1, below 7.125 GHz), SCS for CORESET, optionally and alternatively, for system information block 1 (SIB1), message 2 and/or 4 (Msg. 2/4) for initial access, paging, broadcast SI-messages, may be configured as 15 kHz or 30 kHz.

For Frequency Range 2 (FR2, 24.25 GHz 52.6 GHz), SCS for CORESET, optionally and alternatively, for SIB1, Msg. 2/4 for initial access, paging, broadcast SI-messages, may be configured as 60 kHz or 120 kHz.

For Frequency Range 3 (FR3, higher frequency band above FR2, e.g., 52.6 GHz 71 GHz), the supported SCS by control/data channel may be same or larger than the supported SCS in FR2, such as 240/480/960 kHz, due to phase noise and Doppler shift. SSB and/or CORESET0 CORESET0 may need to support same or larger SCSs than the SCSs supported in FR2.

The present disclosure describes embodiments for performing initial access in one or more frequency range, for example but not limited to, the FR3. One or more embodiment of the present disclosure addresses issues/problems associated with the supported SCS of CORESET0, optionally and alternatively, for SIB1, Msg. 2/4 for initial access, paging, broadcast SI-messages in the one or more frequency range, and notification methods of the SCS. One or more embodiment of the present disclosure addresses issues/problems associated with the notification methods of $k_{SSB}$ which is used to indicate the subcarrier offset from CORESET0 to SSB, if new SCSs of CORESET0 are adopted in the one or more frequency range. One or more embodiment of the present disclosure addresses issues/problems associated with the multiplexing pattern between CORESET0 and SSB if new SCSs of CORESET0 and/or SSB are adopted in the one or more frequency range.

Figure 2:
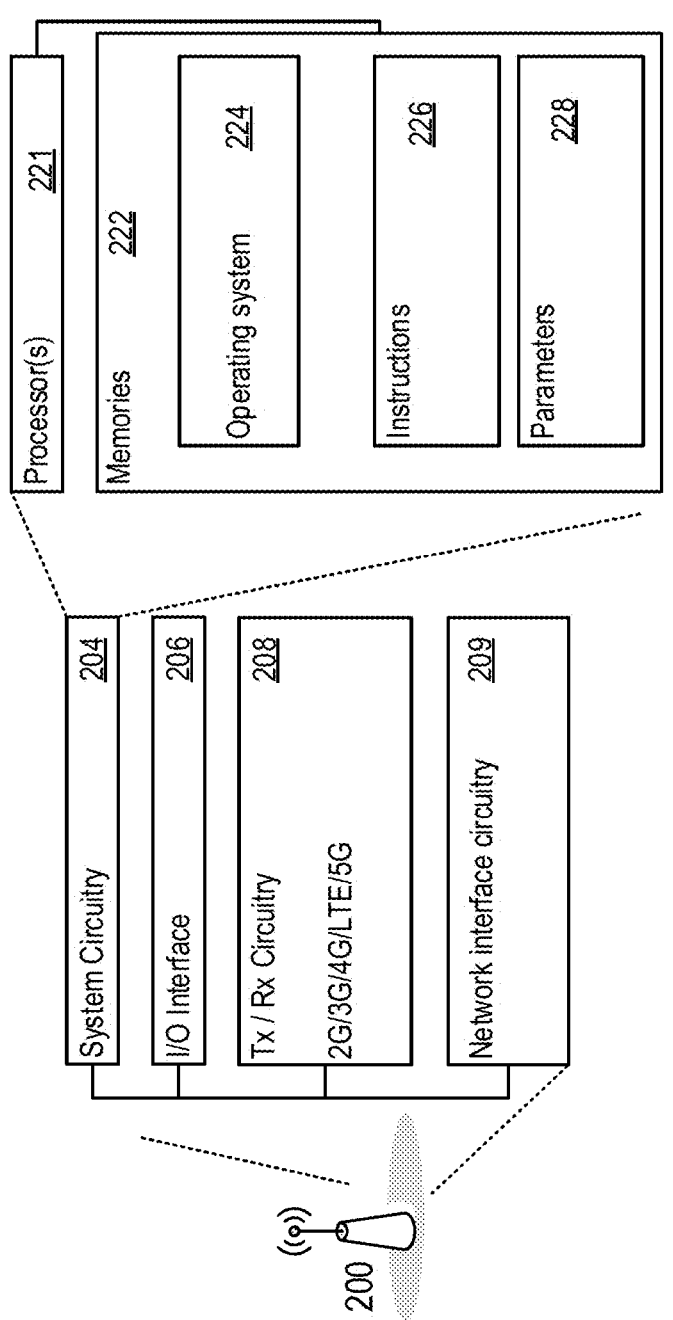
FIG. 2 shows an example of a network node.

FIG. 2 shows an example of electronic device 200 to implement a network base station. The example electronic device 200 may include radio transmitting/receiving (Tx/Rx) circuitry 208 to transmit/receive communication with UEs and/or other base stations. The electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the network node. The parameters 228 may include parameters to support execution of the instructions 226. For example, parameters may include network protocol settings, bandwidth parameters, radio frequency mapping assignments, and/or other parameters.

Figure 3:
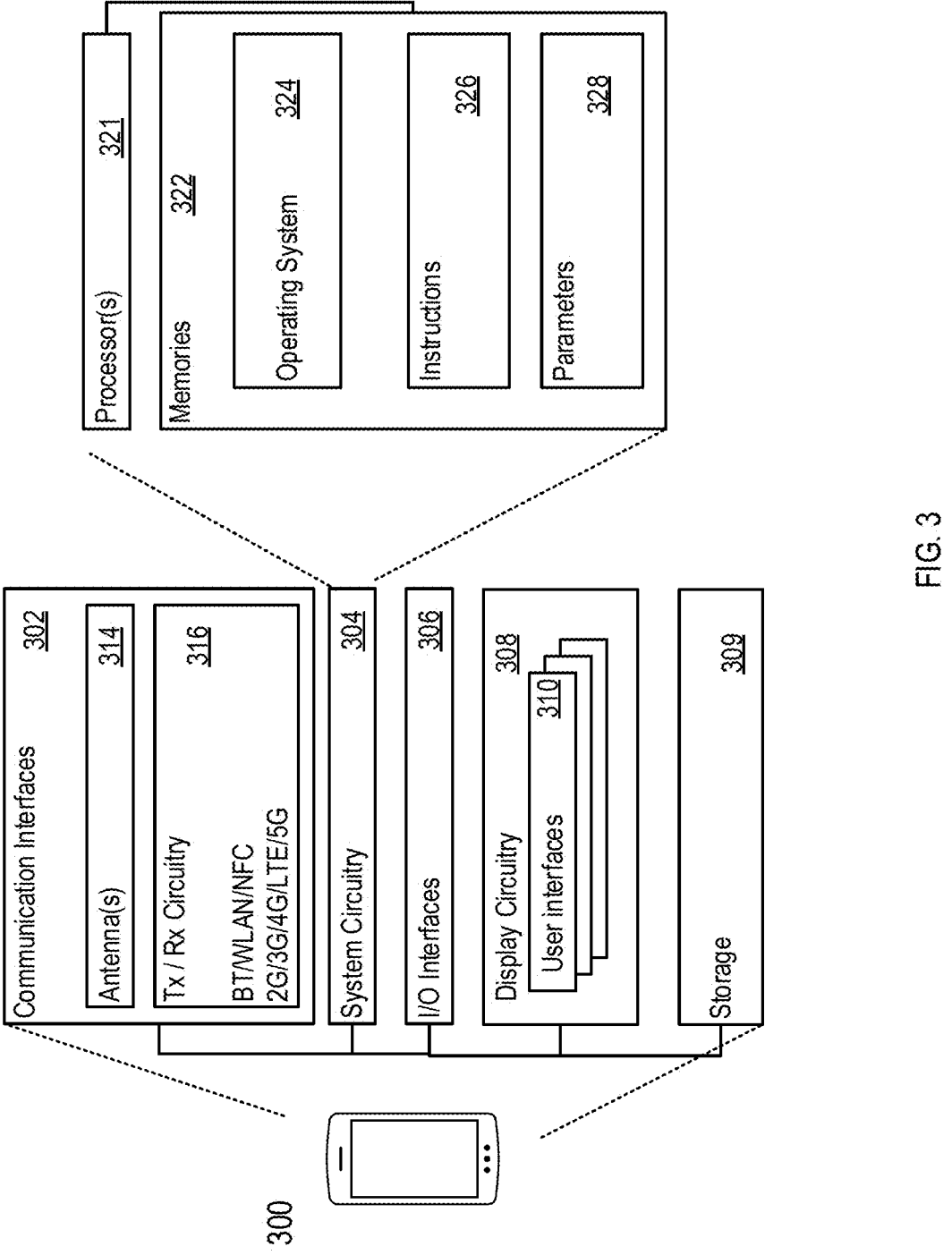
FIG. 3 shows an example of a user equipment.

FIG. 3 shows an example of an electronic device to implement a terminal device 300 (for example, user equipment (UE)). The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, preamplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several below embodiments, which may be implemented, partly or totally, on the network base station and/or the user equipment described above in FIGS. 2-3.

Figure 4:
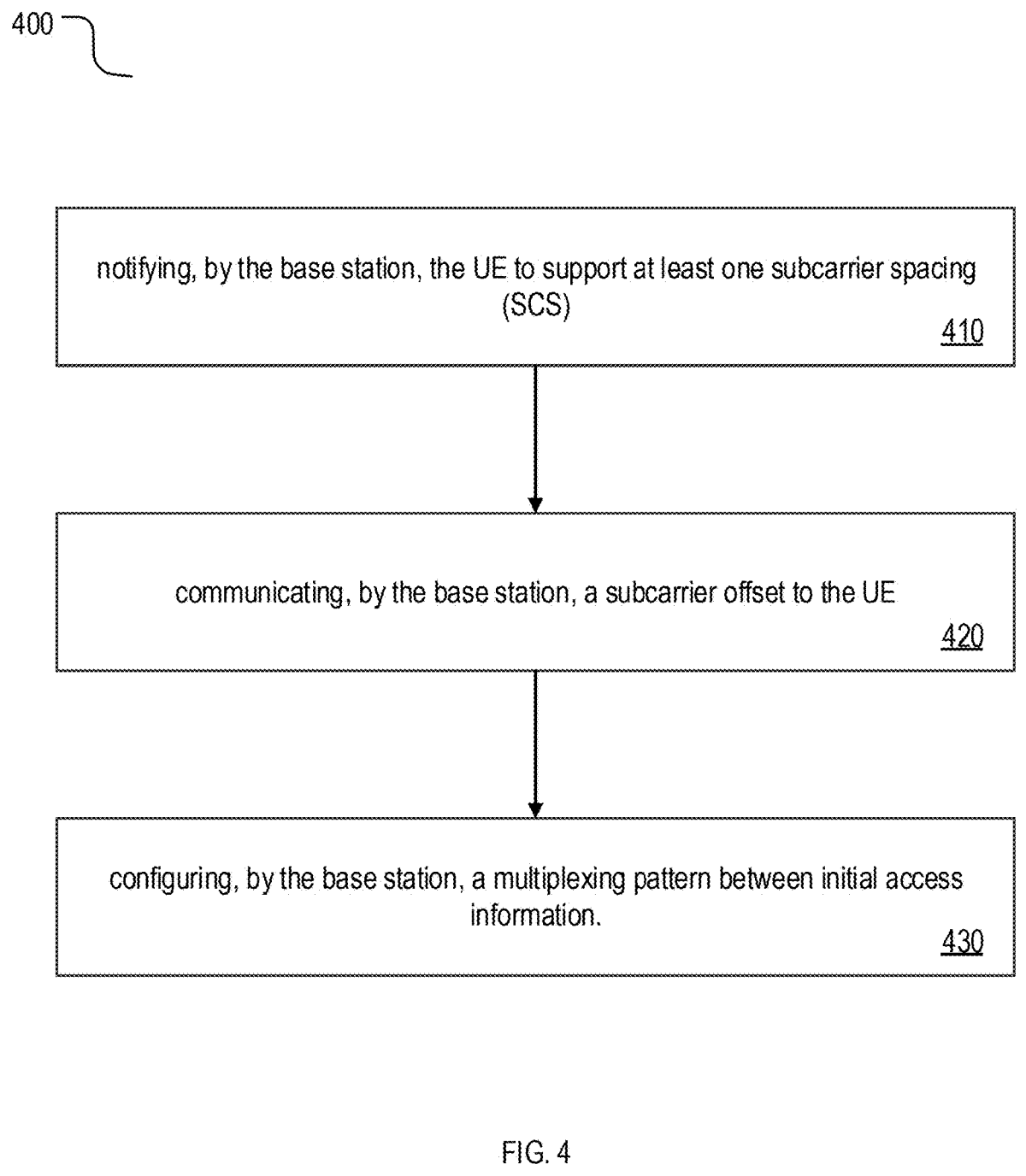

Referring to FIG. 4, the present disclosure describes embodiments of a method 400 for transmitting initial access information from a base station to a user equipment (UE). The method 400 may include step 410: notifying, by the base station, the UE to support at least one subcarrier spacing (SCS); step 420: communicating, by the base station, a subcarrier offset to the UE; and step 430: configuring, by the base station, a multiplexing pattern between initial access information. In one implementation, the initial access information comprises initial access signals or channels comprising at least one of the following: a control resource set for a type 0-physical downlink control channel (CORESET0); or a synchronization signal (SS)/physical broadcast channel (PBCH) block (SSB). In another implementation, the supported at least one SCS is used for at least one of the following: a system information block (SIB), a message for initial access (Msg. 2/4) for initial access, paging, broadcast system information (SI)message, or the CORESET0.

In another implementation, the base station is configured to transmit the initial access information to the UE via a frequency band above 52 GHz.

In another implementation, the supported at least one SCS is configured as at least one of the following: only one SCS comprising one of 120 kHz, 240 kHz, 480 kHz, or 960 kHz; 120 kHz and 240 kHz; 120 kHz and 480 kHz; 120 kHz and 960 kHz; 240 kHz and 480 kHz; 240 kHz and 960 kHz; 480 kHz and 960 kHz; or three or more SCSs comprising frequencies from a set of 120 kHz, 240 kHz, 480 kHz, and 960 kHz.

In another implementation, in response to only one SCS being supported for the CORESET0, a bit field in a master information block (MIB) is configured to be used for informing at least one of the following: a number of quasi-collocation (QCL)relations of SSB; a subcarrier offset from subcarrier 0 in a common resource block to subcarrier 0 of the SSB; or a candidate SSB index.

In another implementation, the bit field in the MIB comprises a subCarrierSpacingCommon.

In another implementation, in response to two SCSs being supported for the CORESET0: the base station maintains an existing signaling of a bit field in a MIB; and the base station uses a signaling of the bit field in the MIB to inform the UE to use one SCS of the two SCSs.

In another implementation, the bit field in the MIB comprises a subCarrierSpacingCommon; and the existing signaling of the subCarrierSpacingCommon in the MIB comprises enumerated values of scs15or60 and scs30or120.

In another implementation, in response to the subCarrierSpacingCommon in the MIB being scs15or60, the subCarrierSpacingCommon in the MIB is configured to inform the UE to use a first SCS of the two SCSs; and in response to the subCarrierSpacingCommon in the MIB being scs30or120, the subCarrierSpacingCommon in the MIB is configured to inform the UE to use a second SCS of the two SCSs, the second SCS being larger than the first SCS.

In another implementation, in response to two SCSs being supported for the CORESET0: the base station modifies an existing signaling of a bit field in a MIB; and the base station uses a modified signaling of the bit field in the MIB to inform the UE to use one SCS of the two SCSs.

In another implementation, the bit field in the MIB comprises a subCarrierSpacingCommon; and the modified signaling of the subCarrierSpacingCommon in the MIB comprises enumerated values of at least one of the following: scs15or60or120 and scs30or120or240, scs15or60or120 and scs30or120or480, scs15or60or120 and scs30or120or960, scs15or60or240 and scs30or120or480, scs15or60or240 and scs30or120or960, or scs15or60or480 and scs30or120or960.

In another implementation, in response to three or more SCSs being supported for the CORESET0, the base station uses one of the following to inform the UE to use one SCS of the three or more SCSs: a subCarrierSpacingCommon in a MIB and a spare bit field in the MIB; or the subCarrierSpacingCommon in the MIB and a spare bit field in a physical broadcast channel (PBCH) payload.

In various embodiments, for frequency range 1 (FR1, below 7.125 GHz), subcarrier spacing (SCS) for SIB1, Msg. 2/4 for initial access, paging, broadcast SI-messages, and/or CORESET0 may be configured as 15 kHz or 30 kHz. For frequency range 2 (FR2, 24.25 GHz 52.6 GHz), SCS for SIB1, Msg. 2/4 for initial access, paging, broadcast SI-messages, and/or CORESET0 may be configured as 60 kHz or 120 kHz. For frequency range 3 (FR3, above FR2., e.g., 52.6 GHz-71 GHz), The supported SCSs and notification methods of SCSs for SIB1, Msg. 2/4 for initial access, paging, broadcast SI-messages, and/or CORESET0 may be configured as at least one of the following examples.

For one example of the embodiments, the supported one or more SCS for SIB1, Msg. 2/4 for initial access, paging, broadcast SI-messages, and/or CORESET0 may be configured as only 120 kHz. In this case, there may be no need to use subCarrierSpacingCommon in a master information block (MIB) to inform the SCSs for SIB1, Msg. 2/4 for initial access, paging, broadcast SI-messages, and/or CORESET0 any more. Thus, subCarrierSpacingCommon in MIB may be used to inform the number of quasi-collocation (QCL) relations of SSB (i.e., $$N_{SSB}^{QCL}),$$

or the subcarrier offset from subcarrier 0 in common resource block to subcarrier 0 of the SSB (i.e., $k_{SSB}$), or a candidate SSB index.

For examples of the embodiments, the supported one or more SCS for SIB1, Msg. 2/4 for initial access, paging, broadcast SI-messages, and/or CORESET0 may be configured as only a single SCS, e.g., 240 kHz, or 480 kHz, or 960 kHz, the same approach as only 120 kHz above may be adopted.

For another example of the embodiments, the supported one or more SCS for SIB1, Msg. 2/4 for initial access, paging, broadcast SI-messages, and/or CORESET0 may be configured as 120 kHz and 240 kHz.

Option 1 may include maintaining the existing signaling of subCarrierSpacingCommon in MIB, and using the signaling of subCarrierSpacingCommon in MIB to inform the SCSs for SIB1, Msg. 2/4 for initial access, paging, broadcast SI-messages, and/or CORESET0. For example, subCarrierSpacingCommon may be enumerated as {scs15or60, scs30or120}. If the UE acquires this MIB on an FR3 carrier frequency, the value scs15or60 corresponds to 120 kHz and the value scs30or120 corresponds to 240 kHz.

Option 2 may include modifying the existing signaling of subCarrierSpacingCommon in MIB, and using the new signaling of subCarrierSpacingCommon in MIB to inform the SCSs for SIB1, Msg. 2/4 for initial access, paging, broadcast SI-messages, and/or CORESET0. For example, subCarrierSpacingCommon may be enumerated as {scs15or60or120, scs30or120or240}. If the UE acquires this MIB on an FR3 carrier frequency, the value scs15or60or120 corresponds to 120 kHz and the value scs30or120or240 corresponds to 240 kHz.

For another example of the embodiments, the supported one or more SCS for SIB1, Msg. 2/4 for initial access, paging, broadcast SI-messages, and/or CORESET0 may be configured as 120 kHz and 480 kHz.

Option 1 may include maintaining the existing signaling of subCarrierSpacingCommon in MIB, and using the signaling of subCarrierSpacingCommon in MIB to inform the SCSs for SIB1, Msg. 2/4 for initial access, paging, broadcast SI-messages, and/or CORESET0. For example, subCarrierSpacingCommon may be enumerated as {scs15or60, scs30or120}. If the UE acquires this MIB on an FR3 carrier frequency, the value scs15or60 corresponds to 120 kHz and the value scs30or120 corresponds to 480 kHz.

Option 2 may include modifying the existing signaling of subCarrierSpacingCommon in MIB, and using the new signaling of subCarrierSpacingCommon in MIB to inform the SCSs for SIB1, Msg. 2/4 for initial access, paging, broadcast SI-messages, and/or CORESET0. For example, subCarrierSpacingCommon may be enumerated as {scs15or60or120, scs30or120or480}. If the UE acquires this MIB on an FR3 carrier frequency, the value scs15or60or120 corresponds to 120 kHz and the value scs30or120or480 corresponds to 480 kHz.

For another example of the embodiments, the supported one or more SCS for SIB1, Msg. 2/4 for initial access, paging, broadcast SI-messages, and/or CORESET0 may be configured as 120 kHz and 960 kHz.

Option 1 may include maintaining the existing signaling of subCarrierSpacingCommon in MIB, and using the signaling of subCarrierSpacingCommon in MIB to inform the SCSs for SIB1, Msg. 2/4 for initial access, paging, broadcast SI-messages, and/or CORESET0. For example, subCarrierSpacingCommon may be enumerated as {scs15or60, scs30or120}. If the UE acquires this MIB on an FR3 carrier frequency, the value scs15or60 corresponds to 120 kHz and the value scs30or120 corresponds to 960 kHz.

Option 2 may include modifying the existing signaling of subCarrierSpacingCommon in MIB, and using the new signaling of subCarrierSpacingCommon in MIB to inform the SCSs for SIB1, Msg. 2/4 for initial access, paging, broadcast SI-messages, and/or CORESET0. For example, subCarrierSpacingCommon may be enumerated as {scs15or60or120, scs30or120or960}. If the UE acquires this MIB on an FR3 carrier frequency, the value scs15or60or120 corresponds to 120 kHz and the value scs30or120or960 corresponds to 960 kHz.

For another example of the embodiments, the supported one or more SCS for SIB1, Msg. 2/4 for initial access, paging, broadcast SI-messages, and/or CORESET0 may be configured as 240 kHz and 480 kHz.

Option 1 may include maintaining the existing signaling of subCarrierSpacingCommon in MIB, and using the signaling of subCarrierSpacingCommon in MIB to inform the SCSs for SIB1, Msg. 2/4 for initial access, paging, broadcast SI-messages, and/or CORESET0. For example, subCarrier-SpacingCommon may be enumerated as {scs15or60, scs30or120}. If the UE acquires this MIB on an FR3 carrier frequency, the value scs15or60 corresponds to 240 kHz and the value scs30or120 corresponds to 480 kHz.

Option 2 may include modifying the existing signaling of subCarrierSpacingCommon in MIB, and using the new signaling of subCarrierSpacingCommon in MIB to inform the SCSs for SIB1, Msg. 2/4 for initial access, paging, broadcast SI-messages, and/or CORESET0. For example, subCarrierSpacingCommon may be enumerated as {scs15or60or240, scs30or120or480}. If the UE acquires this MIB on an FR3 carrier frequency, the value scs15or60or240 corresponds to 240 kHz and the value scs30or120or480 corresponds to 480 kHz.

For another example of the embodiments, the supported one or more SCS for SIB1, Msg. 2/4 for initial access, paging, broadcast SI-messages, and/or CORESET0 may be configured as 240 kHz and 960 kHz.

Option 1 may include maintaining the existing signaling of subCarrierSpacingCommon in MIB, and using the signaling of subCarrierSpacingCommon in MIB to inform the SCSs for SIB1, Msg. 2/4 for initial access, paging, broadcast SI-messages, and/or CORESET0. For example, subCarrier-SpacingCommon may be enumerated as {scs15or60, scs30or120}. If the UE acquires this MIB on an FR3 carrier frequency, the value scs15or60 corresponds to 240 kHz and the value scs30or120 corresponds to 960 kHz.

Option 2 may include modifying the existing signaling of subCarrierSpacingCommon in MIB, and using the new signaling of subCarrierSpacingCommon in MIB to inform the SCSs for SIB1, Msg. 2/4 for initial access, paging, broadcast SI-messages, and/or CORESET0. For example, subCarrierSpacingCommon may be enumerated as {scs15or60or240, scs30or120or960}. If the UE acquires this MIB on an FR3 carrier frequency, the value scs15or60or240 corresponds to 240 kHz and the value scs30or120or960 corresponds to 960 kHz.

For another example of the embodiments, the supported one or more SCS for SIB1, Msg. 2/4 for initial access, paging, broadcast SI-messages, and/or CORESET0 may be configured as 480 kHz and 960 kHz.

Option 1 may include maintaining the existing signaling of subCarrierSpacingCommon in MIB, and using the signaling of subCarrierSpacingCommon in MIB to inform the SCSs for SIB1, Msg. 2/4 for initial access, paging, broadcast SI-messages, and/or CORESET0. For example, subCarrier-SpacingCommon may be enumerated as {scs15or60, scs30or120}. If the UE acquires this MIB on an FR3 carrier frequency, the value scs15or60 corresponds to 480 kHz and the value scs30or120 corresponds to 960 kHz.

Option 2 may include modifying the existing signaling of subCarrierSpacingCommon in MIB, and using the new signaling of subCarrierSpacingCommon in MIB to inform the SCSs for SIB1, Msg. 2/4 for initial access, paging, broadcast SI-messages, and/or CORESET0. For example, subCarrierSpacingCommon may be enumerated as {scs15or60or480, scs30or120or960}. If the UE acquires this MIB on an FR3 carrier frequency, the value scs15or60or240 corresponds to 480 kHz and the value scs30or120or960 corresponds to 960 kHz.

For another example of the embodiments, the supported one or more SCS for SIB1, Msg. 2/4 for initial access, paging, broadcast SI-messages, and/or CORESET0 may be configured as three SCSs or more SCSs, e.g., selected from the set {120 kHz, 240 kHz, 480 kHz, 960 kHz}, e.g., the three supported SCSs={120 kHz, 240 kHz, 480 kHz} or {120 kHz, 240 kHz, 960 kHz}; and/or the four supported SCSs={120 kHz, 240 kHz, 480 kHz, 960 kHz}. More than one bit may be needed to indicate the supported SCSs.

Option 1 may include using the signaling of subCarrier-SpacingCommon in MIB and spare in MIB to inform the SCSs for SIB1, Msg. 2/4 for initial access, paging, broadcast SI-messages, and/or CORESET0.

Option 2 may include using the signaling of subCarrier-SpacingCommon in MIB and the bits in PBCH payload to inform the SCSs for SIB1, Msg. 2/4 for initial access, paging, broadcast SI-messages, and/or CORESET0.

In various embodiments, the subcarrier offset comprises an offset from a subcarrier 0 in a common resource block to a subcarrier 0 in the SSB.

In one implementation of various embodiments, the base station is configured to define a new type of the SSB for a frequency above 52.6 GHz.

In another implementation of various embodiments, for the new type of the SSB, the subcarrier offset comprises at least one of the following: a first range from 0 to 23, inclusive; or a second range from 0 to 47, inclusive.

In another implementation of various embodiments, for the new type of the SSB, a higher-layer parameter comprises four least-significant bits of the subcarrier offset.

In another implementation of various embodiments, the higher-layer parameter comprises ssb-SubcarierOffset.

In another implementation of various embodiments, for the new type of the SSB, at least one most-significant bit of the subcarrier offset is configured by at least one of the following: at least one new bit in a PBCH payload; a PBCH demodulation reference signal (DMRS) scrambling sequence; a master information block (MIB) message; a system information block 1 (SIB1); or an other system information (OSI) comprising at least one of SIB2, SIB3, or SIB4.

For one example of the various embodiments, an offset from the CORESET for Type0-PDCCH CSS set (i.e., CORESET0) to the corresponding SS/PBCH block (SSB) may be divided into two types. The first type is at resource block (RB) level offset; and the second type is subcarrier level offset, i.e., $k_{SSB}$. The quantity $k_{SSB}$ is the subcarrier offset from subcarrier 0 in common resource block $$N_{CRB}^{SSB}$$

to subcarrier 0 of the SS/PBCH block. In some implementations, $k_{SSB}$ may be referred as $k_{SSB}$.

For FR2 (24.25 GHz~52.6 GHz), i.e., for SSB type B, $k_{SSB} \in \{0,1,2, \ldots ,11\}$ with the quantity $k_{SSB}$ may be expressed in terms of the subcarrier spacing provided by the higher-layer parameter, for example, subCarrierSpacing-Common, and $$N_{CRB}^{SSB}$$

may be expressed in terms of 60 kHz subcarrier spacing.

For FR3 (above FR2., e.g., 52.6 GHz~71 GHz), larger SCSs for CORESET0 may be introduced, e.g., 240 kHz, 480 kHz or 960 kHz in above embodiment. In these cases, the SCS provided by the higher-layer parameter (e.g, subCarrierSpacingCommon) may not be suitable for the quantity $k_{SSB}$ since the SCS may be too larger for the UE find the accurate frequency position of CORESET0 based on the detection of SSB.

For FR3, a new SSB type C may be defined. For SSB type C, the quantity $k_{SSB}$ may be expressed in terms of 120 kHz subcarrier spacing. In another implementation, the quantity $k_{SSB}$ may be expressed in terms of the minimum SCS among SCS of the SSB and SCS of the CORESET.

For FR3, the SCS of CORESET0 may be larger than SSB, the value range of $k_{SSB}$ may be from 0 to 23, inclusive, or from 0 to 47, inclusive. 4 least significant bits of $k_{SSB}$ may be given by the higher-layer parameter ssb-SubcarrierOffset. The one or two most significant bit of $k_{SSB}$ may be given by at least one of the following: new bit(s) in the PBCH payload (not $\bar{a}_{A+5}$), PBCH DMRS scrambling sequence, MIB message, SIB1, or OSI (other system information, e.g., SIB2/3/4).

In various embodiments, the base station configures the multiplexing pattern between the SSB and the CORESET0.

In one implementation, in response to a SCS of the SSB being 120 kHz and a SCS of the CORESET being 240 kHz, the base station configures the multiplexing pattern with first symbol indexes of corresponding CORESETs for SSBs based on the SCS of the CORESET comprising at least one of the following: 0,1,2,3 in slot 0; 0 and 2 in slot 0, 0 and 2 in slot 2; 0 and 4 in slot 0, 0 and 2 in slot 2; 0,2,4,6 in slot 0; 0 and 2 in slot 0, 10 and 12 in slot 1; 0 and 4 in slot 0, 10 in slot 1, 0 in slot 2; 0 and 1 in slot 0, 0 and 1 in slot 2; or 8 in slot 0, 2 in slot 1, 4 in slot 2, 12 in slot 2.

In another implementation, in response to a SCS of the SSB and a SCS of the CORESET being 240 kHz, the base station configures the multiplexing pattern with first symbol indexes of corresponding CORESETs for SSBs comprising 8, 12, 2, 6, 8, 12, 2, and 6, respectively.

In another implementation, in response to a SCS of the SSB and a SCS of the CORESET being 480 kHz or 960 kHz, the base station configures the multiplexing pattern with first symbol indexes of corresponding CORESETs for SSBs comprising at least one of the following: 4, 8, 2, and 6, respectively; or 8, 12, 2, 6, 8, 12, 2, and 6, respectively.

In another implementation, a system frame number (SFN) and a slot index within a frame of the CORESET based on the SCS of the CORESET are equal to a SFN and a slot index based on the SCS of the CORESET, respectively.

In another implementation, the first symbol indexes of the CORESETs are based on at least one of the following: the SCS of the CORESET, or the SCS of the SSB.

In another implementation, a number of symbols of each CORESET equals to at least one of the following: 1, 2, 3, or 4.

For one example of the various embodiments, for frequency above FR2, for example, FR3, or 52.6 GHz-71 GHz, larger SCSs for CORESET may be introduced, including 240 kHz, 480 kHz, or 960 kHz in various embodiments discussed above. In some embodiments/implementations, CORESET may represent CORESET for Type0-PDCCH CSS set, i.e., CORESET0.

One example describes a multiplexing pattern when the SCS of the SSB is 120 kHz and the SCS of the CORESET is 240 kHz.

Figures 5A, 5B:
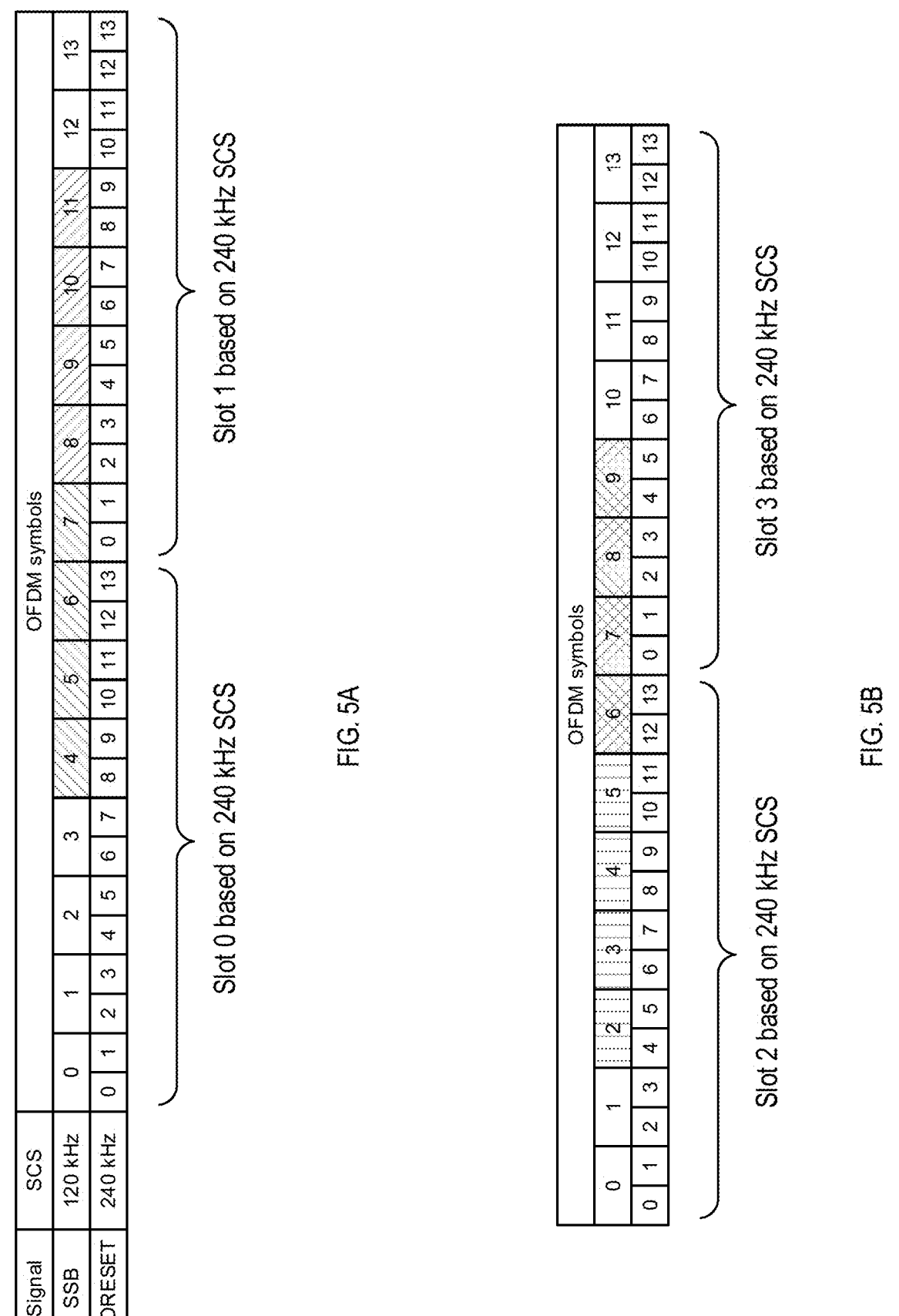
FIG. 5A shows a schematic diagram of an exemplary embodiment for wireless communication.
FIG. 5B shows another schematic diagram following the schematic diagram in FIG. 5A.

FIGS. 5A and 5B illustrate a time duration with 0.25 milliseconds, i.e., 2 slots/28 symbols with SCS 120 kHz of SSB, or 4 slots/56 symbols with SCS 240 kHz of CORESET, which includes four SSBs (SSB i, i=4k, i=4k+1, i=4k+2 i=4k+3). The four slots based on SCS 240 kHz of CORESET may be indexed slot 0, slot 1, slot 2, slot 3.

The first symbol index(s) of the corresponding CORESET(s) of the SSB i (i=4k, i=4k+1, i=4k+2, i=4k+3) may be at least one of the following. The first symbol index(s) of the CORESET(s) is based on SCS of the CORESET: 0,1,2,3 in slot 0; 0 and 2 in slot 0, 0 and 2 in slot 2; 0 and 4 in slot 0, 0 and 2 in slot 2; 0,2,4,6 in slot 0; 0 and 2 in slot 0, 10 and 12 in slot 1; 0 and 4 in slot 0, 10 in slot 1, 0 in slot 2; 0 and 1 in slot 0, 0 and 1 in slot 2; 8 in slot 0, 2 in slot 1, 4 in slot 2, 12 in slot 2.

In one implementation, the number of symbols of the CORESET may equal to 1, 2, 3, or 4.

When the number of symbols of the CORESET equals to 2 or more, at least one of the following may apply to the first symbol index(s) of the CORESET(s) based on SCS of the CORESET: 0 and 2 in slot 0, 0 and 2 in slot 2; 0 and 4 in slot 0, 0 and 2 in slot 2; 0,2,4,6 in slot 0; 0 and 2 in slot 0, 10 and 12 in slot 1; 0 and 4 in slot 0, 10 in slot 1, 0 in slot 2; or 8 in slot 0, 2 in slot 1, 4 in slot 2, 12 in slot 2.

In another implementation, the CORESET may be located in the same or the previous slot of the corresponding SSB based on the SCS of the SSB. When the CORESET is located in the same slot of the corresponding SSB, at least one of the following may apply to the first symbol index(s) of the CORESET(s) based on SCS of the CORESET: 0 and 2 in slot 0, 0 and 2 in slot 2; 0 and 4 in slot 0, 0 and 2 in slot 2; 0 and 1 in slot 0, 0 and 1 in slot 2; or 8 in slot 0, 2 in slot 1, 4 in slot 2, 12 in slot 2.

Figures 6A, 6B:
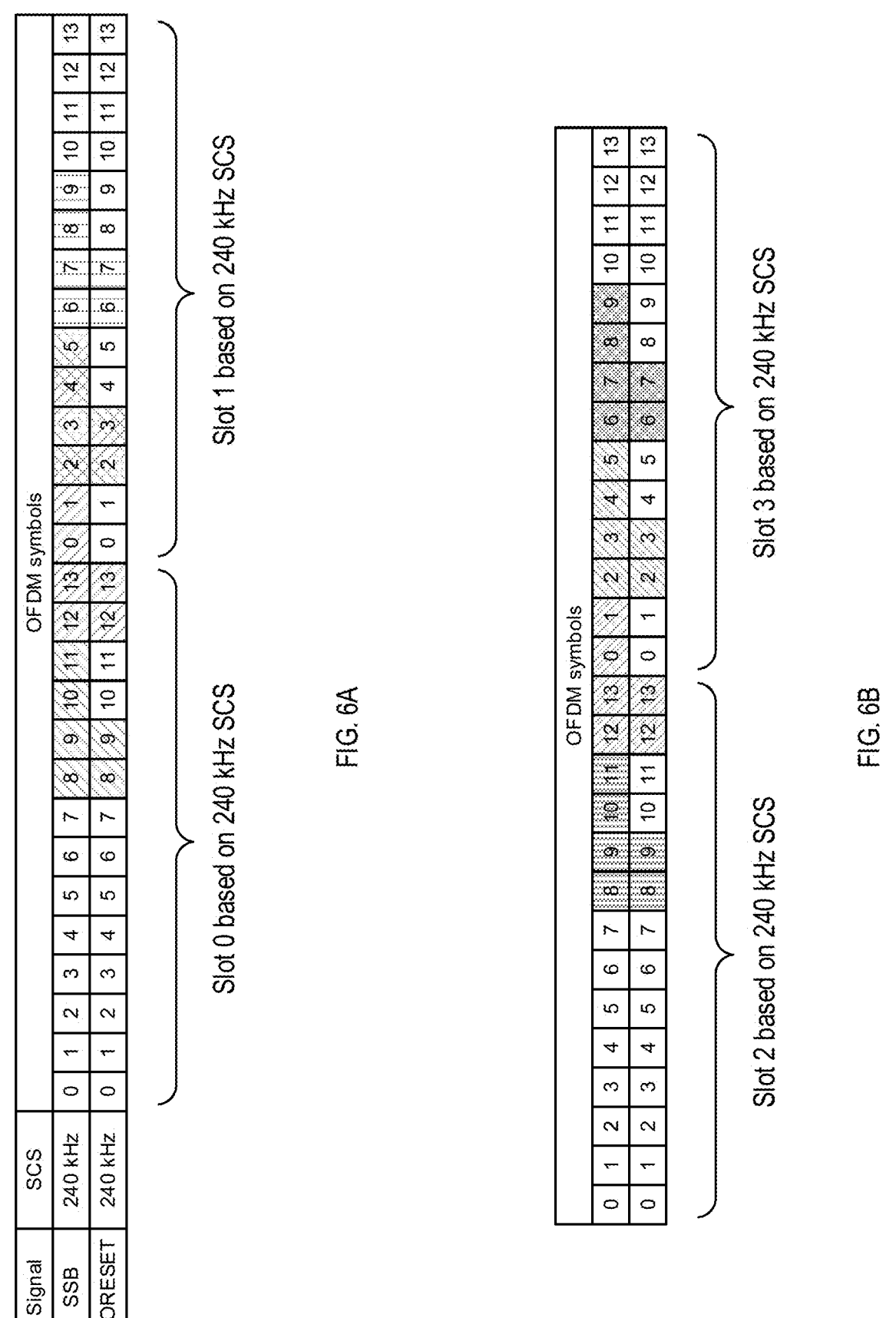
FIG. 6A shows a schematic diagram of an exemplary embodiment for wireless communication.
FIG. 6B shows another schematic diagram following the schematic diagram in FIG. 6A.

Another example describes a multiplexing pattern when the SCS of the SSB is 240 kHz and the SCS of the CORESET is 240 kHz. FIGS. 6A and 6B illustrate a time duration with 0.25 milliseconds, i.e., 4 slots/56 symbols with SCS 240 kHz of SSB/CORESET, which includes eight SSBs (SSB i, i=8k, i=8k+1, i=8k+2, i=8k+3, i=8k+4, i=8k+5, i=8k+6, i=8k+7). The four slots based on SCS 240 kHz of SSB/CORESET may be indexed slot 0, slot 1, slot 2, slot 3.

The first symbol index(s) of the corresponding CORESET(s) of the SSB i (SSB i, i=8k, i=8k+1, i=8k+2, i=8k+3, i=8k+4, i=8k+5 i=8k+6, i=8k+7) may be 8, 12, 2, 6, 8, 12, 2, 6, respectively. In one implementation, $SFN_c = SFN_{SSB, i}$ and $n_c = n_{SSB, i}$. $SFN_c$ and $n_c$ are the SFN and slot index within a frame of the CORESET based on SCS of the CORESET; and $SFN_{SSB, i}$ and $n_{SSB, i}$ are the SFN and slot index based on SCS of the CORESET, respectively, where the SS/PBCH block with index i overlaps in time with system frame $SFN_{SSB, i}$ and slot $n_{SSB, i}$. The first symbol index(s) of the CORESET(s) may be based on SCS of the CORESET or SSB.

In some implementations, the first symbol of the corresponding CORESET(s) of the SSB may be located at the first symbol of the SSB. In one implementation, the number of symbols of CORESET equals to 2. In another implementation, the number of symbols of CORESET may be any integer number between 1 and 4, inclusive.

Another example describes a multiplexing pattern when the SCS of the SSB is 480 kHz and the SCS of the CORESET is 480 kHz.

Option 1 may include configuring the first symbol index(s) of the corresponding CORESET(s) of the SSB i (i=4k, i=4k+1, i=4k+2, i=4k+3) to be 4, 8, 2, 6, respectively. In some implementations, $SFN_c=SFN_{SSB,\ i}$ and $n_c=n_{SBB,\ i}$. $SFN_c$ and $n_c$ are the SFN and slot index within a frame of the CORESET based on SCS of the CORESET; and $SFN_{SBB,\ i}$ and $n_{SSB,\ i}$, are the SFN and slot index based on SCS of the CORESET, respectively, where the SS/PBCH block with index i overlaps in time with system frame $SFN_{SSB,\ i}$ and slot $n_{SSB,\ i}$. In some implementations, the first symbol index(s) of the CORESET(s) is based on SCS of the CORESET or SSB.

Option 2 may include configuring the first symbol index(s) of the corresponding CORESET(s) of the SSB i (SSB i, i=8k, i=8k+1, i=8k+2, i=8k+3, i=8k+4, i=8k+5, i=8k+6, i=8k+7) to be 8, 12, 2, 6, 8, 12, 2, 6, respectively. In some implementations, $SFN_c=SFN_{SBB,\ i}$ and $n_c=n_{SBB,\ i}$. $SFN_c$ and $n_c$ are the SFN and slot index within a frame of the CORESET based on SCS of the CORESET; and $SFN_c$ $n_{SSB,\ i}$ and are the SFN and slot index based on SCS of the CORESET, respectively, where the SS/PBCH block with index i overlaps in time with system frame $SFN_{SSB,\ i}$ and slot $n_{SSB,\ i}$. In some implementations, the first symbol index(s) of the CORESET(s) is based on SCS of the CORESET or SSB.

Another example describes a multiplexing pattern when the SCS of the SSB is 960 kHz and the SCS of the CORESET is 960 kHz.

Option 1 may include configuring the first symbol index(s) of the corresponding CORESET(s) of the SSB i (=4k, i=4k+1, i=4k+2, i=4k+3) to be 4, 8, 2,6, respectively. In some implementations, $SFN_C=SFN_{SSB,\ i}$ and $n_c=n_{SSB,\ i}$. $SFN_c$ and $n_c$ are the SFN and slot index within a frame of the CORESET based on SCS of the CORESET; and $SFN_{SSB,\ i}$ and $n_{SSB,\ i}$ are the SFN and slot index based on SCS of the CORESET, respectively, where the SS/PBCH block with index i overlaps in time with system frame $SFN_{SSB,\ i}$ and slot $n_{SSB,\ i}$. In some implementations, the first symbol index(s) of the CORESET(s) is based on SCS of the CORESET or SSB.

Option 2 may include configuring the first symbol index(s) of the corresponding CORESET(s) of the SSB i (SSB i, i=8k, i=8k+1, i=8k+2, i=8k+3, i=8k+4, i=8k+5 i=8k+6, i=8k+7) to be 8, 12, 2, 6, 8, 12, 2, 6, respectively. In some implementations, $SFN_c=SFN_{SSB,\ i}$ and $n_c=n_{SBB,\ i}$. $SFN_c$ and $n_C$ are the SFN and slot index within a frame of the CORESET based on SCS of the CORESET; and $SFN_{SSB,\ i}$ and $n_{SSB,\ i}$ are the SFN and slot index based on SCS of the CORESET, respectively, where the SS/PBCH block with index i overlaps in time with system frame $SFN_{SSB,\ i}$ and slot $n_{SSB,\ i}$. In some implementations, the first symbol index(s) of the CORESET(s) is based on SCS of the CORESET or SSB.

The present disclosure describes methods, apparatus, and computer-readable medium for wireless communication. The present disclosure addressed the issues with transmitting, by a base station, initial access information to a user equipment (UE). The methods, devices, and computer-readable medium described in the present disclosure may facilitate the performance of wireless transmission between a user equipment and a base station, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:
transmitting, by a base station, initial access information to a user equipment (UE) by:
    notifying, by the base station, the UE to support at least one subcarrier spacing (SCS);
    communicating, by the base station, a subcarrier offset to the UE;
    configuring, by the base station, a multiplexing pattern between the initial access information; and
    in response to three or more SCSs comprising frequencies from a set of 120 kHz, 240 kHz, 480 kHz, and 960 kHz being supported for a control resource set for a type 0-physical downlink control channel (CORESET0), utilizing, by the base station, a sub-CarrierSpacingCommon in a master information block (MIB) and a spare bit field in a physical broadcast channel (PBCH) payload to inform the UE to use a SCS of the three or more SCSs for at least one of a system information block 1 (SIB1), message 2/4 (Msg. 2/4) for initial access, paging, broadcast system information (SI) messages, or the CORESET0,
    wherein the subCarrierSpacingCommon in the MIB and the spare bit field in PBCH payload jointly indicate the SCS of the three or more SCSs.

2. The method according to claim 1, wherein:
the initial access information comprises initial access signals or channels comprising at least one of the following:
a control resource set for a type 0-physical downlink control channel (CORESET0); or
a synchronization signal (SS)/physical broadcast channel (PBCH) block (SSB); and
the supported at least one SCS is used for at least one of the following: a system information block (SIB), a message for initial access (Msg. 2/4) for initial access, paging, broadcast system information (SI) message, or the CORESET0.

3. The method according to claim 2, wherein:
the supported at least one SCS is configured as at least one of the following:
    only one SCS comprising one of 120 kHz, 240 kHz, 480 kHz, or 960 kHz;
    120 kHz and 240 kHz;
    120 kHz and 480 kHz;
    120 kHz and 960 kHz;
    240 kHz and 480 kHz;

240 kHz and 960 kHz;

480 kHz and 960 kHz; or three or more SCSs comprising frequencies from a set of 120 kHz, 240 kHz, 480 kHz, and 960 kHz.

4. A method for wireless communication, comprising:

receiving, by a user equipment (UE), initial access information from a base station by:

receiving, by the UE from the base station, notification to support at least one subcarrier spacing (SCS);

receiving, by the UE from the base station, a communication comprising a subcarrier offset;

receiving, by the UE from the base station, a configuration for a multiplexing pattern between initial access information; and in response to three or more SCSs comprising frequencies from a set of 120 kHz, 240 kHz, 480 kHz, and 960 kHz being supported for a control resource set for a type 0-physical downlink control channel (CORESET0), receiving, by the UE from the base station, a subCarrierSpacingCommon in a master information block (MIB) and a spare bit field in a physical broadcast channel (PBCH) payload to inform the UE to use one SCS of the three or more SCSs for at least one of a system information block 1 (SIB1), message 2/4 (Msg. 2/4) for initial access, paging, broadcast system information (SI) messages, or the CORESET0, wherein the subCarrierSpacingCommon in the MIB and the spare bit field in PBCH payload jointly indicate the SCS of the three or more SCSs.

5. The method according to claim 4, wherein:

the initial access information comprises initial access signals or channels comprising at least one of the following:

a control resource set for a type 0-physical downlink control channel (CORESET0); or a synchronization signal (SS)/physical broadcast channel (PBCH) block (SSB); and the supported at least one SCS is used for at least one of the following: a system information block (SIB), a message for initial access (Msg. 2/4) for initial access, paging, broadcast system information (SI) message, or the CORESET0.

6. The method according to claim 5, wherein:

the supported at least one SCS is configured as at least one of the following:

only one SCS comprising one of 120 kHz, 240 kHz, 480 kHz, or 960 kHz;

120 kHz and 240 kHz;

120 kHz and 480 kHz;

120 kHz and 960 kHz;

240 kHz and 480 kHz;

240 kHz and 960 kHz;

480 kHz and 960 kHz; or three or more SCSs comprising frequencies from a set of 120 kHz, 240 kHz, 480 kHz, and 960 kHz.

7. An apparatus comprising:

a memory storing instructions; and a processor in communication with the memory, wherein, when the processor executes the instructions, the processor is configured to cause the apparatus to perform:

transmitting initial access information to a user equipment (UE) by:

notifying the UE to support at least one subcarrier spacing (SCS);

communicating a subcarrier offset to the UE;

configuring a multiplexing pattern between initial access information; and in response to three or more SCSs comprising frequencies from a set of 120 kHz, 240 kHz, 480 kHz, and 960 kHz being supported for a control resource set for a type 0-physical downlink control channel (CORESET0), utilizing a subCarrierSpacingCommon in a master information block (MIB) and a spare bit field in a physical broadcast channel (PBCH) payload to inform the UE to use one SCS of the three or more SCSs for at least one of a system information block 1 (SIB1), message 2/4 (Msg. 2/4) for initial access, paging, broadcast system information (SI) messages, or the CORESET0, wherein the subCarrierSpacingCommon in the MIB and the spare bit field in PBCH payload jointly indicate the SCS of the three or more SCSs.

8. An apparatus comprising:

a memory storing instructions; and a processor in communication with the memory, wherein, when the processor executes the instructions, the processor is configured to cause the apparatus to perform the method according to claim 4.

9. A non-transitory computer-readable program medium storing instructions, wherein, the instructions, when executed by a processor, are configured to cause the processor to implement the method according to claim 1.

10. A non-transitory computer-readable program medium storing instructions, wherein, the instructions, when executed by a processor, are configured to cause the processor to implement the method according to claim 4.

* * * * *